United States Patent [19]

Sewell et al.

[11] 4,372,717
[45] Feb. 8, 1983

[54] CELLULAR VOID FILLER

[76] Inventors: James D. Sewell, 5005 Yarrow Ct., Fair Oaks, Calif. 95628; Norman E. Gordon, 7743 Claypool Way, Citrus Heights, Calif. 95610

[21] Appl. No.: 341,093

[22] Filed: Jan. 20, 1982

[51] Int. Cl.³ .................. B60P 7/16; B61D 45/00; B65G 1/14; B32B 3/12
[52] U.S. Cl. .................. 410/154; 410/155; 428/116; 428/119
[58] Field of Search .......... 428/116, 118, 119, 120, 428/177, 184, 185, 186, 188, 192; 410/154, 155

[56] References Cited

U.S. PATENT DOCUMENTS

| | | | |
|---|---|---|---|
| 2,980,573 | 4/1961 | Clifford | 410/154 |
| 3,501,367 | 3/1970 | Parker | 428/116 |
| 3,593,671 | 7/1971 | Bramlett | 428/116 |
| 3,700,522 | 10/1972 | Wonderly | 428/116 X |
| 4,007,309 | 2/1977 | Sewell | 428/116 |
| 4,130,682 | 12/1978 | Lauko | 428/116 |
| 4,300,864 | 11/1981 | Liebel et al. | 410/154 |
| 4,349,303 | 9/1982 | Liebel et al. | 410/154 |

*Primary Examiner*—William J. Van Balen
*Attorney, Agent, or Firm*—Lothrop & West

[57] ABSTRACT

An expandable honeycomb slab constructed from sheet material of corrugated paperboard, for filling load voids within a container carrying articles of freight. A plurality of horizontal cell rows, each containing a central diamond-shaped cell straddled by a pair of square-shaped cells, is stacked in vertical relation. Vertically adjacent corners and apexes of the cells are interconnected so as to allow vertical expansion of the suspended cellular array under its own weight. The vertically aligned, centrally positioned diamond-shaped cells provide vertical support and horizontal rigidity for the array, effectively preventing the honeycomb slab from assuming an hourglass configuration.

10 Claims, 2 Drawing Figures

CELLULAR VOID FILLER

BACKGROUND OF THE INVENTION

The invention relates generally to void fillers or dunnage devices, expandable when suspended to form a honeycomb slab, or cellular array. More specifically, a honeycomb slab of simplified construction exhibiting both superior strength and an improved expanded configuration is disclosed.

After articles of freight have been loaded into railroad boxcars or other shipping containers, space voids often remain between adjacent stacks of goods or between stacks of goods and a nearby wall. If these voids are not filled, the contained articles may shift during transit, possibly damaging the goods or the walls and doors of the container. Specialized dunnage to fill these voids has assumed a unitized honeycomb or cellular construction, compressible into a short stack for storage and expandable into an elongated array for actual use. The honeycomb slab itself is commonly assembled from sheet material, such as corrugated paperboard. A hanging mechanism, usually resting upon the stacks of freight articles or attached to an adjacent wall, suspends the honeycomb slab for expansion downwardly under its own weight.

Owing to the orientation of the paperboard corrugations, the honeycomb slab exhibits considerable resistance to forces applied normal to the faces of the slab, and little resistance to forces acting normal to the edges of the slab. Thus, individual cells, especially within the median portion of the structure, distend or elongate in a vertical aspect when the array is suspended. Consequently, the honeycomb slab of conventional design has a tendency to narrow in its median portion, or assume an hourglass shape, creating voids into which articles of freight may slide or shift.

In Bramlett, U.S. Pat. No. 3,593,671, rigid sheet members are shown transversely positioned within certain of the cells, to restrict horizontal contraction and undue vertical elongation of the honeycomb slab. U.S. Pat. No. 4,007,309, issued to Sewell, illustrates another approach, employing a number of stiff strips of corrugated paperboard interspersed throughout the slab, their corrugations extending from edge to edge of the slab. The present invention represents a further improvement over these designs in that simplified construction, increased strength, and linear shape of the expanded honeycomb slab are offered.

SUMMARY OF THE INVENTION

The honeycomb or cellular void filler of present design includes a plurality of vertically stacked cell rows, each row having a centrally positioned diamond-shaped cell bounded on either side by a square-shaped cell. The elongated, or major axis of each diamond-shaped cell is vertically oriented and the upper and lower cell apexes of vertically adjacent diamond-shaped cells are interconnected. Similarly, one diagonal axis of each square-shaped cell is vertically oriented, and the upper and lower cell corners of vertically adjacent square-shaped cells are attached.

The dimensions and proportions of the diamond-shaped cells are such that when the honeycomb slab is suspended and vertically extended under its own weight, the central line of elongated diamond-shaped cells bears substantially the entire weight of the cell assemblage. By transferring the load bearing duties to this line of cells, the square-shaped cells will not become elongated or distorted under the stress of supporting the slab.

In addition to providing vertical support for the slab, each diamond-shaped cell affords a lateral anchor for the inner corners of its respective square-shaped cells. In other words, by interconnecting the cells in the disclosed fashion, a state of equilibrium is reached where the forces of vertical elongation counterbalance the forces of horizontal contraction. Consequently, the lateral, outer corners of the square-shaped cells are maintained in substantial vertical alignment, and the unwanted hourglass effect is eliminated.

DETAILED DESCRIPTION OF THE PREFERRED EMBODIMENT

Figure 1:
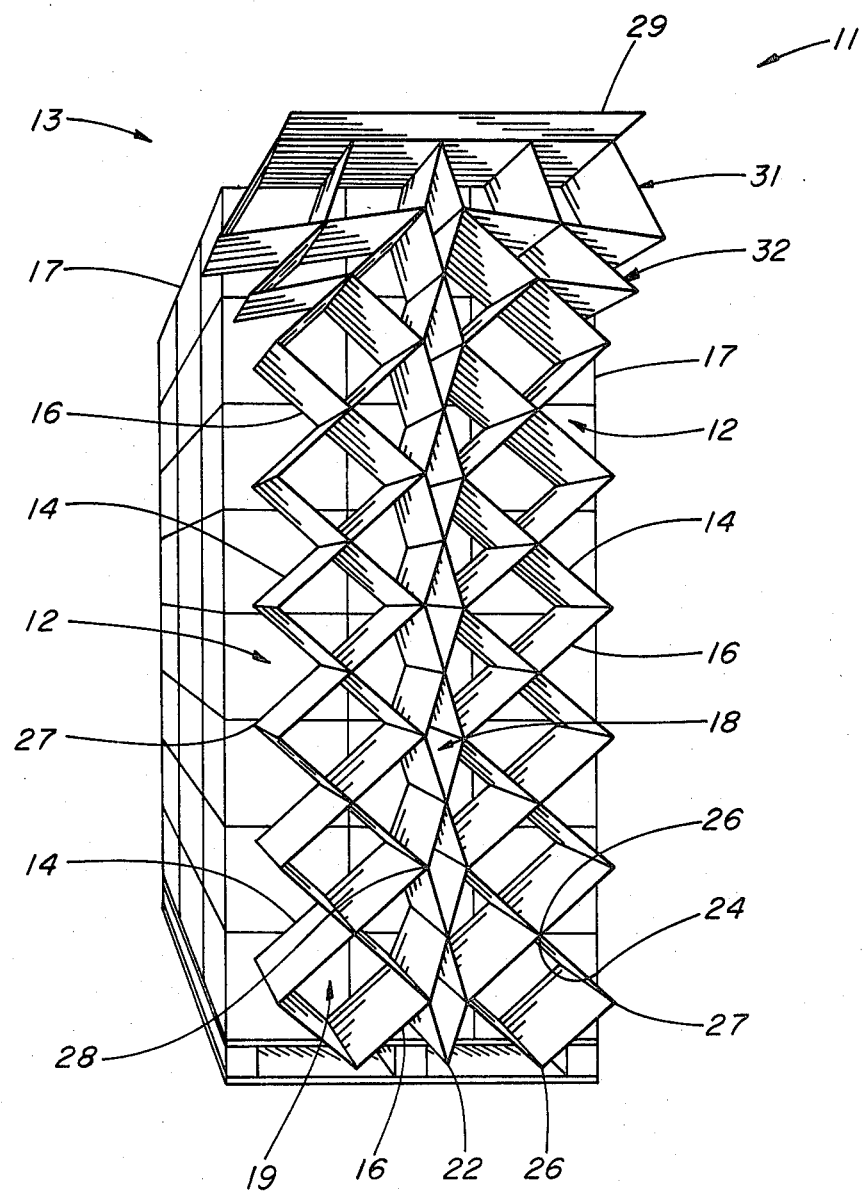
FIG. 1 is a front perspective view of the vertically extended honeycomb slab depending from a stack of freight articles.

The honeycomb slab 11, or cellular array includes a plurality of interconnected horizontal cell rows 12 depending from a suspension structure 13. Making particular reference to FIG. 2, each cell row 12 has an elongated upper strip 14 and an elongated lower strip 16, both fabricated from sheet material such as corrugated paper board. The corrugation flutes of the strips 14 and 16 are aligned in a direction normal to the front and rear faces of the slab 11, and are therefore normal to vertical, planar surface of the stack 17 of freight articles. This particular flute orientation provides maximum strength or resistance to forces acting against the faces of the slab, while allowing relatively unhindered vertical expansion or contraction of the cellular array as desired.

Figure 2:
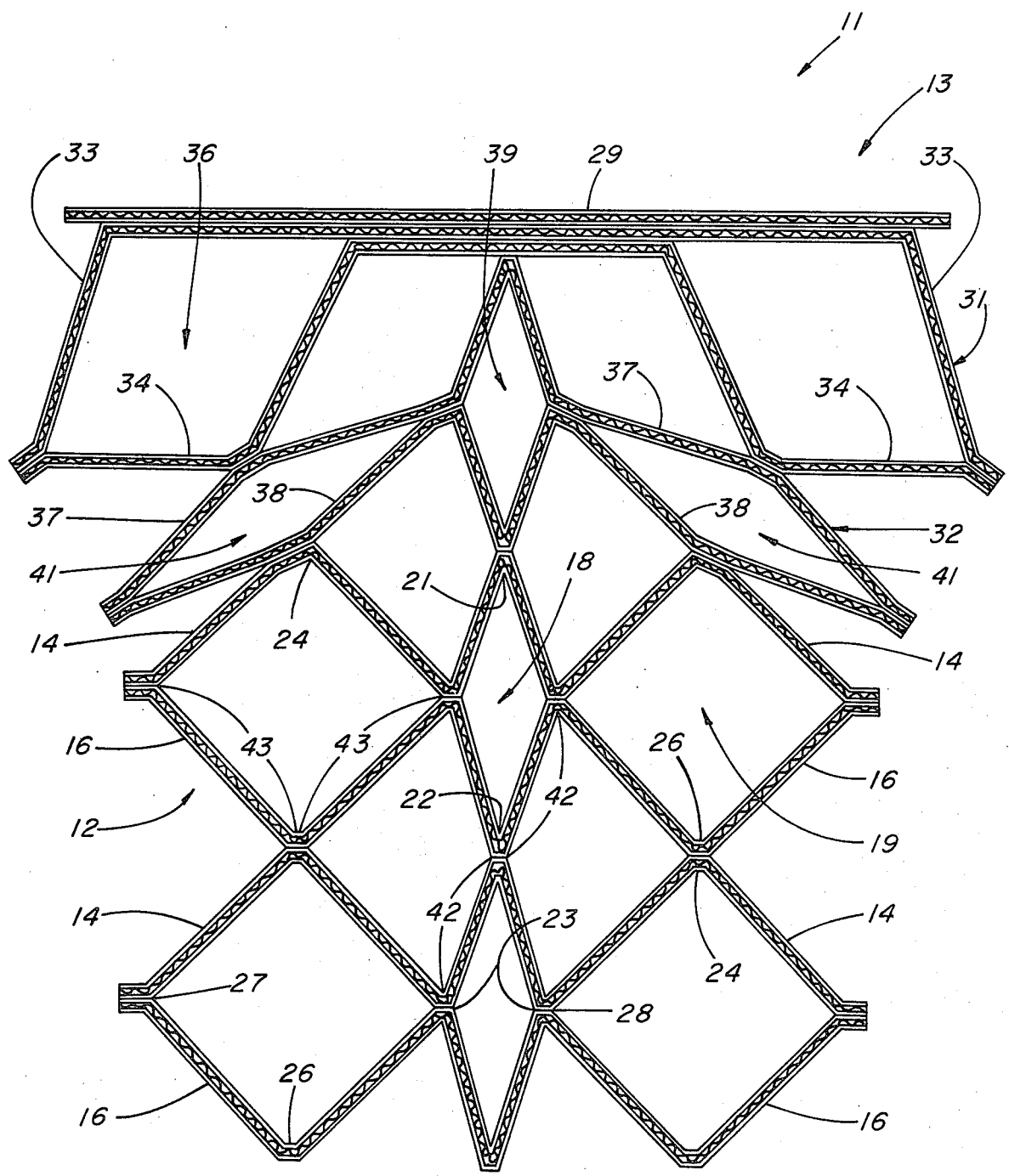
FIG. 2 is a front elevational view, taken to an enlarged scale, of two cell rows stacked and expanded in vertical relation and depending from the suspension portion of the honeycomb slab.

The upper strip 14 and lower strip 16 are connected at their respective end extremities and at two predetermined intermediate points so as to form a centrally positioned diamond-shaped cell 18 straddled by a pair of generally square-shaped cells 19. The major axis of the diamond-shaped cell 18 and one of the diagonals of each square-shaped cell 19 are vertically oriented, as is best illustrated in FIG. 2.

The diamond-shaped cell further includes an upper apex 21, a lower apex 22, and opposing lateral apexes 23, while each square-shaped cell 19 further includes an upper corner 24, a lower corner 26, an outer corner 27, and an inner corner 28. Progressing from the lowermost cell row 12, successive cell rows 12 are stacked in vertical relation, the upper apex 21 and the upper corners 24 of a particular cell row being attached to the respective lower apex 22 and the lower corners 26 of the overlying, or superjacent cell row by means of glue, staples, or the like.

The uppermost cell row 12 depends from the suspension structure 13, comprising a base sheet 29, a base cell row 31, and a transition cell row 32, all constructed from corrugated paperboard of a like nature and in a like manner to that set forth above. The base sheet 29 is designed to overlie and overlap the upper adjacent edge portions of a pair of stacks 17 of freight articles. Thus, while FIG. 1 shows solely a single stack 17 abutting a respective face of the slab 11, in actual practice, another stack (not shown) would abut the opposing face of the slab 11, each providing collateral support for the other. Alternatively, the opposing face of the slab 11 would abut the wall of the container (not shown), and in that case the base sheet 29 would be modified for attachment by any number of means to the container wall.

The base cell row 31 includes a top strip 33 and a bottom strip 34, both substantially identical in size to the upper and lower strips 14 and 16 within each cell row 12. However, the top and bottom strips 33 and 34 are assembled quite differently than their lower counterparts. With the exception of its drooping end portions, the entire middle portion of the strip 33 is attached to the lower surface of the base sheet 29 (see FIG. 2). While the respective end extremities of the strips 33 and 34 are attached, a substantial median portion of the bottom strip 34 is attached to and coextensive with an overlying portion of the top strip 33. Consequently, when the base cell row 31 is expanded, it provides two laterally opposing base cells 36 but no centrally positioned diamond-shaped cell.

The transition cell 32 is unique in that while its construction is virtually identical to the lower cell rows 12, its expanded configuration only somewhat resembles an expanded cell row 12. Included within the transition cell row 32 are an overlying strip 37 and an underlying strip 38, adjoined in the same fashion as the upper and lower strips 14 and 16. The transition cell row 32 is interposed between and attached to respective portions of the base cell row 31 and the uppermost cell row 12 (see FIGS. 1 and 2).

When expanded, the transition cell row 32 includes a diamond-shaped, central transition cell 39 and diamond-shaped, lateral transition cells 41. While the central transition cell 39 is fully extended and elongated under the stress of supporting the underlying cell rows 12, it is evident that the lateral transition cells 41 are only partially extended and under little stress in vertically supporting the underlying square-shaped cells 19 of the upper-most cell row 12. The lateral transition cells 41 act more to anchor and properly space the points at which the uppermost cell row attaches to the suspension structure 13, rather than to support the weight of the cell rows 12.

Any number of alternative supporting means could be used to suspend the plurality of cell rows by point attachment and support of the corners 24 and the apex 21 of the cells in the uppermost cell row 12. For instance, direct attachment of the uppermost cell row to the base sheet 29 or passing transverse supporting poles underneath its corners 24 and the apex 21 would suspend the slab and allow it to expand into a proper configuration. However, one of the chief advantages of the suspension structure 13 disclosed herein is its ability to contract into a flat compact stack having generally the same dimensions in plan as those of the collapsed cell rows. As can be seen in FIG. 2, the symmetrical shapes and generally horizontal orientations of the cell folding axes within the suspension structure 13 allow it to nest or compress in flat relation against the base sheet 29. The direct attachment method described above would not allow the cell rows to collapse into a flat uniform stack and the pole support method creates other undesirable complications during storage, erection, and disassembly of the slab.

The suspension structure 13 and particularly the transition cell row 32 are further adapted to support the uppermost cell row 12 with its upper apex 21 and its upper corners 24 lying in the same horizontal plane. And, when the honeycomb slab 11 is fully extended as in FIG. 1, in each cell row 12, the upper apex 21 and the upper corners 24, and the lower apex 22 and the lower corners 26, respectively, are in horizontal alignment. This repetitious alignment pattern is the consequence of two interrelated factors, namely, the size and placement of the diamond-shaped cells 18 with respect to the square-shaped cells 19.

Making particular reference to FIG. 2, it is apparent that the side dimension 42 of each diamond-shaped cell 18 is considerably less than the side dimension 43 of each square-shaped cell 19. Specifically, the side dimension 43 exceeds the side dimension 42 by a factor of approximately 1.4 times.

For an average honeycomb slab 11, having a height from eight to twelve feet and a width of thirty-six to forty-two inches, and being constructed from corrugated paperboard material, this particular proportion between side dimensions 42 and 43 has proved quite satisfactory. However, if the array size or the construction material was changed considerably, a correspondingly different side proportion ratio may be necessary. By way of example, if the array height or overall weight were increased, a further vertical elongation or horizontal compression would be expected. Consequently, the side proportion ratio may have to be increased in commensurate fashion, to re-establish proper horizontal alignment of the upper apexes 21 with the upper corners 24 and the lower apexes 22 with the lower corners 26.

The placement of each diamond-shaped cell 18, both with respect to its laterally adjacent square-shaped cells 19 and with respect to its vertically adjacent diamond-shaped cells 18, is also crucial to a uniform honeycomb slab configuration. Functioning much in the same manner as the lateral transition cells 41, the diamond-shaped cells 18 act to secure or anchor the inner corners of the square-shaped cells 19. The respective apexes of vertically adjacent diamond-shaped cells 18 are interconnected and in vertical alignment, providing a centrally positioned supportive core within the slab. As has been previously explained, the dimensions of the diamond-shaped cells are such that almost the entire weight of the array is sustained by the diamond-shaped cells 18, while the unstressed square-shaped cells 19 are allowed to expand to full suze and remain undistorted in shape.

Manufacture of the array is simplified since virtually all of the structural elements, with the exception of the base sheet, are constructed from sheets having identical dimensions and flute orientations. Excepting the base cell row, each of the cell rows is glued together along the same transverse glue lines, making preparation and assembly of the structural elements more manageable.

With all of the flute corrugations directed normal to the slab face, the present array further exhibits improved strength over prior art designs which required the corrugations of a certain number of structural sheets to be oriented parallel to the slab and to the adjacent articles of freight.

Further owing to the unified flute orientation, the array can undergo a rapid transition from a compressed to an expanded state without overstressing the adjoining glue lines. Previous slab designs, having cross-oriented flutes, resist expansion and experience occasional glue line separations.

The centrally positioned line, or vertical core of diamond-shaped cells assures that the outer corners of the square-shaped cells remain in vertical alignment. The cellular array of present design therefore expands into a linear configuration and the extended diamond-shaped cells retain that ideal configuration.

Other apparent variations upon this basic design would include at least two square-shaped cells on either side of the diamond-shaped cell to expand the overall width of the array as desired. Additional diamond-shaped cells could be horizontally spaced and appropriately distributed throughout an array having an unusually wide breadth. These variations are based upon the same principles of design and operation as the preferred embodiment, and are offered solely by way of example rather than as limitations upon the scope of the invention.

We claim:

1. A structure expandable from a generally flat stack to form a cellular void filler comprising:
   a. a horizontal cell row including an elongated, upper strip of sheet material overlying and coextensive with an elongated, lower strip of sheet material, said upper and said lower strips being attached at their respective end extremities and at two predetermined intermediate points to form a central, supportive cell having an upper apex, a lower apex, and opposing lateral apexes, said lateral apexes each at a respective one of said intermediate points, and a pair of generally square-shaped cells straddling said supportive cell, each of said generally square-shaped cells having an upper corner, a lower corner, an outer corner, and an inner corner, each of said inner corners located at a respective one of said intermediate points; and,
   b. suspension means attached to said upper apex and said upper corners of said cell row for supporting said cell row in an expanded condition for filling a void.

2. A structure as in claim 1 further including a plurality of said horizontal cell rows stacked in vertical relation, said upper apex and said upper corners in each of said cell rows being attached to the respective said lower apex and said lower corners in the superjacent said cell row, and wherein the side dimension of said supportive cells between an apex and an adjacent lateral apex is less than the side dimension of said generally square-shaped cells between adjacent corners, the plurality of apex-connected supportive cells depending from said suspension means being effective substantially to support said plurality of said cell rows in an expanded condition, thereby maintaining said outer corners of said generally square-shaped cells in substantial vertical alignment.

3. A structure as in claim 2 having at least two of said generally square-shaped cells straddling either side of said supportive cell in each of said horizontal cell rows.

4. A structure as in claim 2 wherein said suspension means includes an elongated, horizontal base strip overlying and supporting said plurality of horizontal cell rows, and in which one longitudinal edge of said base strip overlies and rests upon an adjacent stack of freight articles.

5. A structure as in claim 4 wherein both longitudinal edges of said base strip overlie and rest upon a respective adjacent stack of freight articles.

6. A structure as in claim 4 wherein the other longitudinal edge of said base strip is attached to an adjacent wall of a container housing the freight articles.

7. A structure as in claim 2 wherein the sheet material is corrugated paperboard having horizontally and transversely oriented flutes.

8. A structure as in claim 4 wherein said suspension means further includes a horizontal base cell row depending from and underlying said base strip and a horizontal transition cell row depending from and underlying said base cell row and in which said base cell row includes a planar median portion and two laterally opposing base cells and in which said transition cell row includes a diamond-shaped central transition cell and diamond-shaped lateral transition cells, the lower portion of each said base cell being attached to respective underlying portions of said lateral transition cells and the upper portion of said central transition cell being attached to the middle of said median portion, said transition cell row being effective to support and position horizontally the upper said apex and upper said corners of the uppermost said cell row when said plurality of said cell rows is expanded.

9. A structure as in claim 2 wherein the ratio between the side dimensions of said generally square-shaped cells and the side dimensions of said supportive cells is correspondingly dependent upon the weight of the structure and the compliancy of the sheet material so that when the array is fully expanded and under the force of gravity, said outer corners of said generally square-shaped cells are maintained in substantial vertical alignment.

10. A structure as in claim 9 wherein the side dimensions of said generally square-shaped cells exceed the side dimensions of said supportive cells by a factor of approximately 1.4 times.

* * * * *